United States Patent
Cheng et al.

(10) Patent No.: US 10,498,419 B2
(45) Date of Patent: Dec. 3, 2019

(54) METHOD AND APPARATUS FOR DETERMINING DIRECTION FOR TRANSMISSION TO ESTABLISH WIRELESS CONNECTIONS

(71) Applicant: PERASO TECHNOLOGIES INC., Toronto (CA)

(72) Inventors: Gary Cheng, Unionville (CA); Christopher James Hansen, Los Altos, CA (US); Joseph Andonieh, Aurora (CA); Bradley Robert Lynch, Toronto (CA)

(73) Assignee: PERASO TECHNOLOGIES INC., Toronto (CA)

( * ) Notice: Subject to any disclaimer, the term of this patent is extended or adjusted under 35 U.S.C. 154(b) by 0 days.

(21) Appl. No.: 15/869,956

(22) Filed: Jan. 12, 2018

(65) Prior Publication Data

US 2018/0198507 A1 Jul. 12, 2018

Related U.S. Application Data

(60) Provisional application No. 62/445,487, filed on Jan. 12, 2017.

(51) Int. Cl.
*H04B 7/06* (2006.01)
*H04B 7/0426* (2017.01)
(Continued)

(52) U.S. Cl.
CPC .......... *H04B 7/0617* (2013.01); *H04B 7/043* (2013.01); *H04B 7/0643* (2013.01);
(Continued)

(58) Field of Classification Search
None
See application file for complete search history.

(56) References Cited

U.S. PATENT DOCUMENTS

2016/0277088 A1\* 9/2016 Jo ........................ H04B 7/0408
2016/0323823 A1  11/2016 Ryoo et al.
(Continued)

FOREIGN PATENT DOCUMENTS

WO   WO-2017003172 A1   1/2017

OTHER PUBLICATIONS

EPO, Extended European Search Report, dated Jun. 18, 2018, re European Patent Application No. 181515164.
(Continued)

*Primary Examiner* — Lonnie V Sweet
(74) *Attorney, Agent, or Firm* — Perry + Currier

(57) ABSTRACT

A method in a wireless communications assembly of a first station having a plurality of antennas and configured to perform a beamforming procedure with a second station, the method comprising: controlling the plurality of antennas to simultaneously transmit, using a first sector of each of the plurality of antennas, a respective first beam including first frame data containing a first beam set identifier element identifying each of the plurality of antennas and each of the first sectors; subsequently controlling the plurality of antennas to simultaneously transmit, using a second sector of each of the plurality of antennas, a respective second beam including second frame data containing a second beam set identifier element identifying each of the plurality of antennas and each of the second sectors; and receiving, from the second station, first feedback data including one of the first beam set identifier element and the second beam set identifier element.

16 Claims, 6 Drawing Sheets

Figure 1:
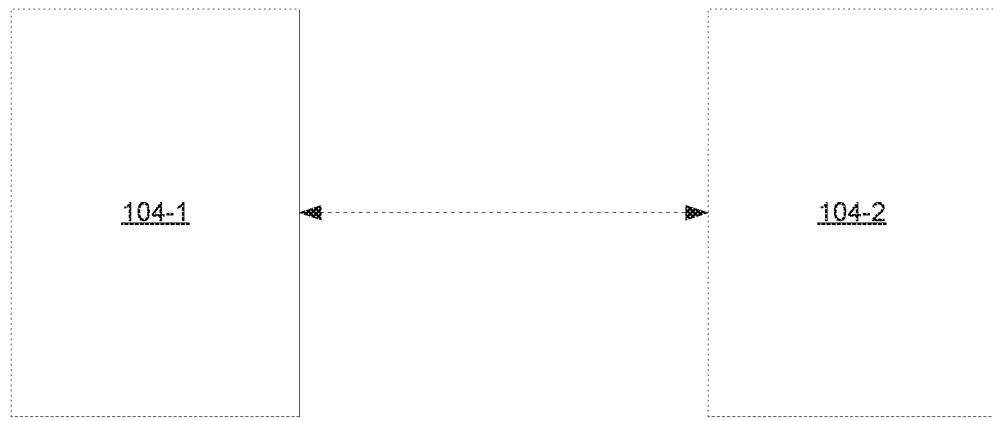

(51) Int. Cl.
  H04B 7/08    (2006.01)
  H04B 7/185   (2006.01)
  H04B 7/26    (2006.01)
(52) U.S. Cl.
  CPC ........... H04B 7/0695 (2013.01); H04B 7/088 (2013.01); H04B 7/1855 (2013.01); H04B 7/2656 (2013.01)

(56) References Cited

U.S. PATENT DOCUMENTS

2017/0126303 A1* 5/2017 Jo ..................... H04B 7/0684
2018/0109303 A1* 4/2018 Yoo .................... H04B 7/0695

OTHER PUBLICATIONS

"ISO/IEC/IEEE International Standard for Information Technology—Telecommunications and information exchange between systems—Local and metropolitan area networks—Specific requirements—Part 11: Wireless LAN Medium Access Control (MAC) and Physical Layer (PHY) Specifications Amendment 3: Enhancements", IEEE Standard, IEEE, Piscataway, NJ, USA, Mar. 14, 2014, pp. 1-634.

* cited by examiner

METHOD AND APPARATUS FOR DETERMINING DIRECTION FOR TRANSMISSION TO ESTABLISH WIRELESS CONNECTIONS

CROSS-REFERENCE TO RELATED APPLICATIONS

This application claims priority from U.S. provisional application No. 62/445,487, filed Jan. 12, 2017, the content of which is incorporated herein by reference.

FIELD

The specification relates generally to wireless communications, and specifically to a method and apparatus for determining a direction for transmission to establish wireless connections.

BACKGROUND

Certain wireless communications protocols, such as those in the Institute of Electrical and Electronics Engineers (IEEE) 802.11 family of standards, define a variety of features, some of which may be mandatory and others of which may be optional. In order to establish connections, wireless communications devices operating under such standards may first determine a direction for transmission by performing a sector sweep. The sector sweep allows the device to transmit data over various sectors of the antenna to determine a suitable direction for transmission. For wireless communications devices containing more than one antenna, each antenna may sequentially perform a sector sweep to determine a suitable direction for transmission per antenna.

SUMMARY

An aspect of the specification provides a method in a wireless communications assembly of a first station having a plurality of antennas and configured to perform a beamforming procedure with a second station comprising: controlling the plurality of antennas to simultaneously transmit, using a first sector of each of the plurality of antennas, a respective first beam including first frame data containing a first beam set identifier element identifying each of the plurality of antennas and each of the first sectors; subsequently controlling the plurality of antennas to simultaneously transmit, using a second sector of each of the plurality of antennas, a respective second beam including second frame data containing a second beam set identifier element identifying each of the plurality of antennas and each of the second sectors; and receiving, from the second station, first feedback data including one of the first beam set identifier element and the second beam set identifier element.

BRIEF DESCRIPTIONS OF THE DRAWINGS

Figure 2:
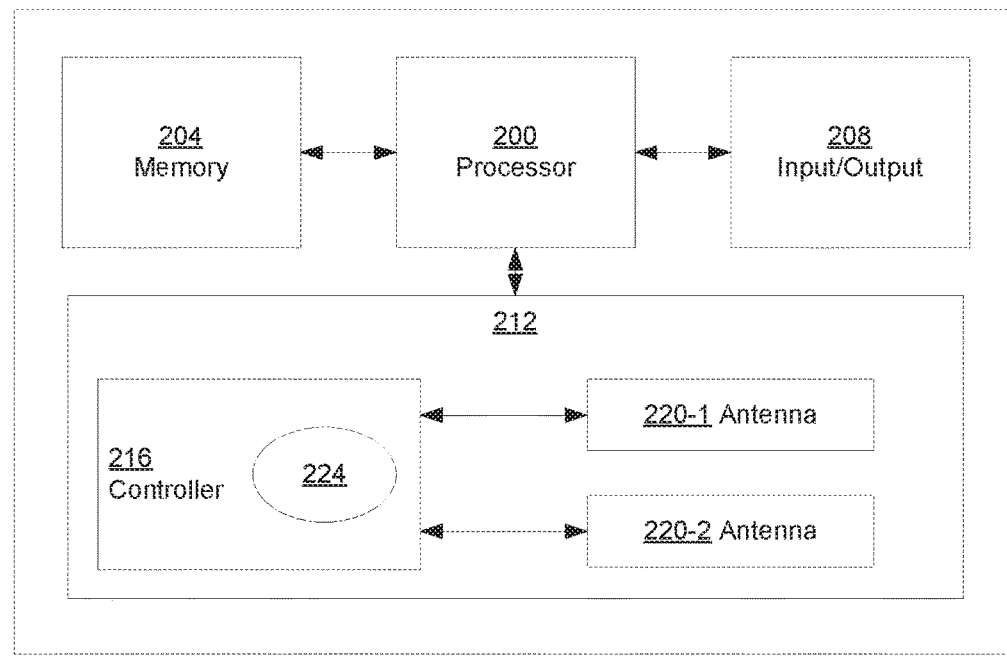
Figure 3:
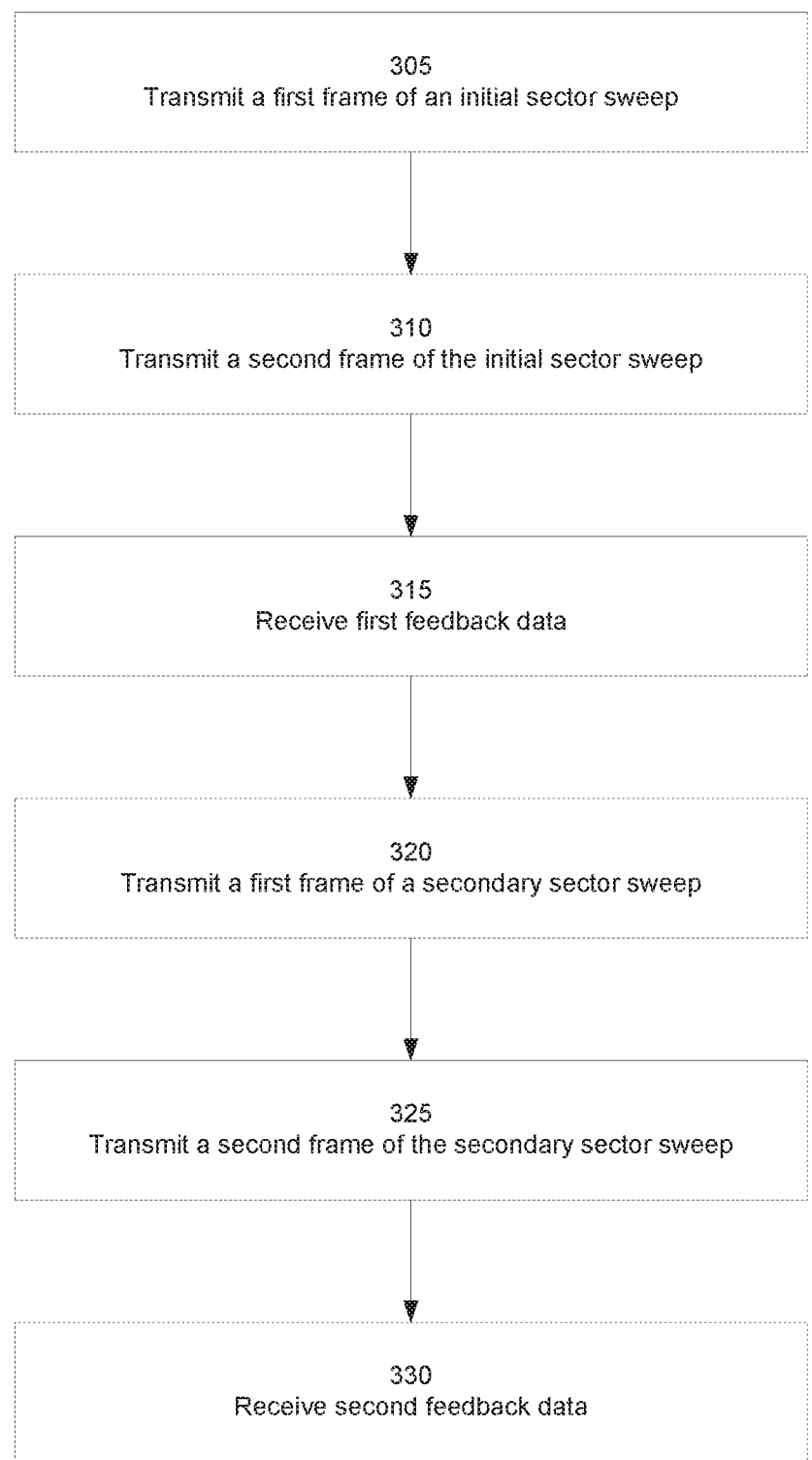
Figure 4A:
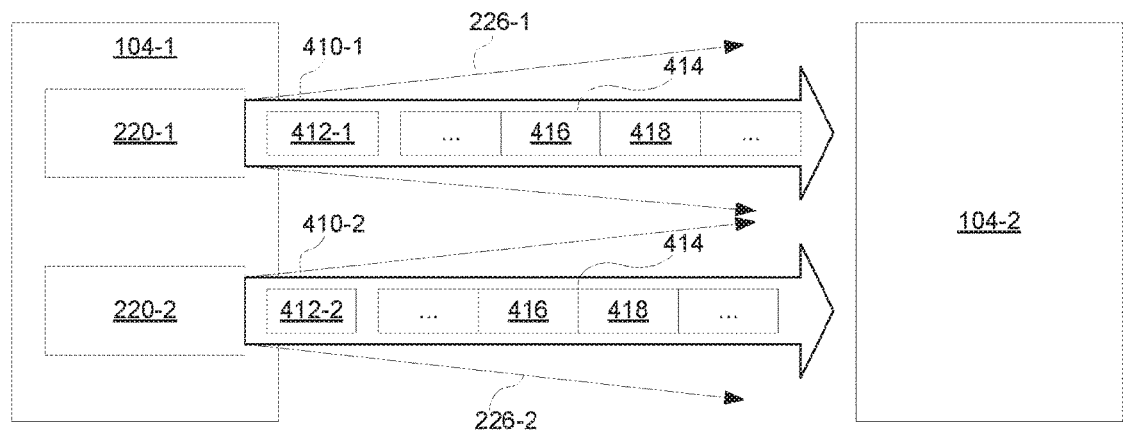
Figure 4B:
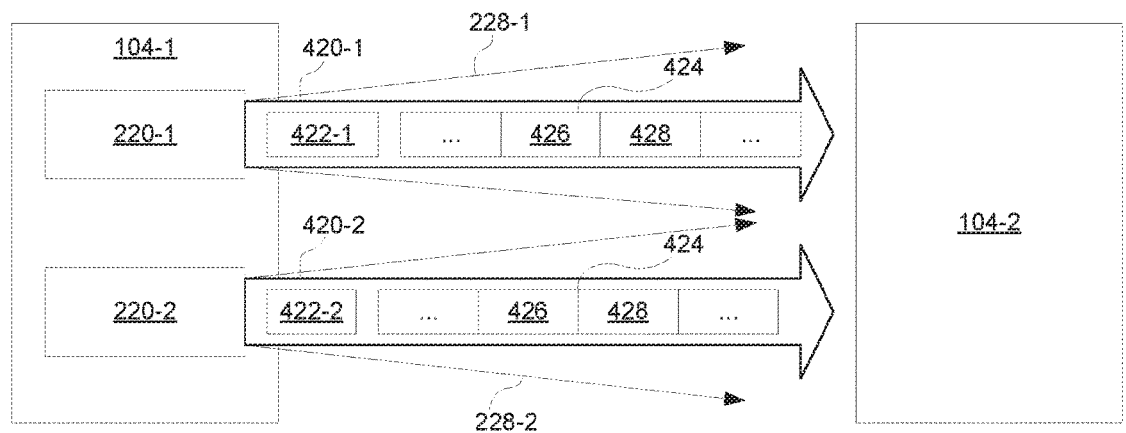
Figure 5:
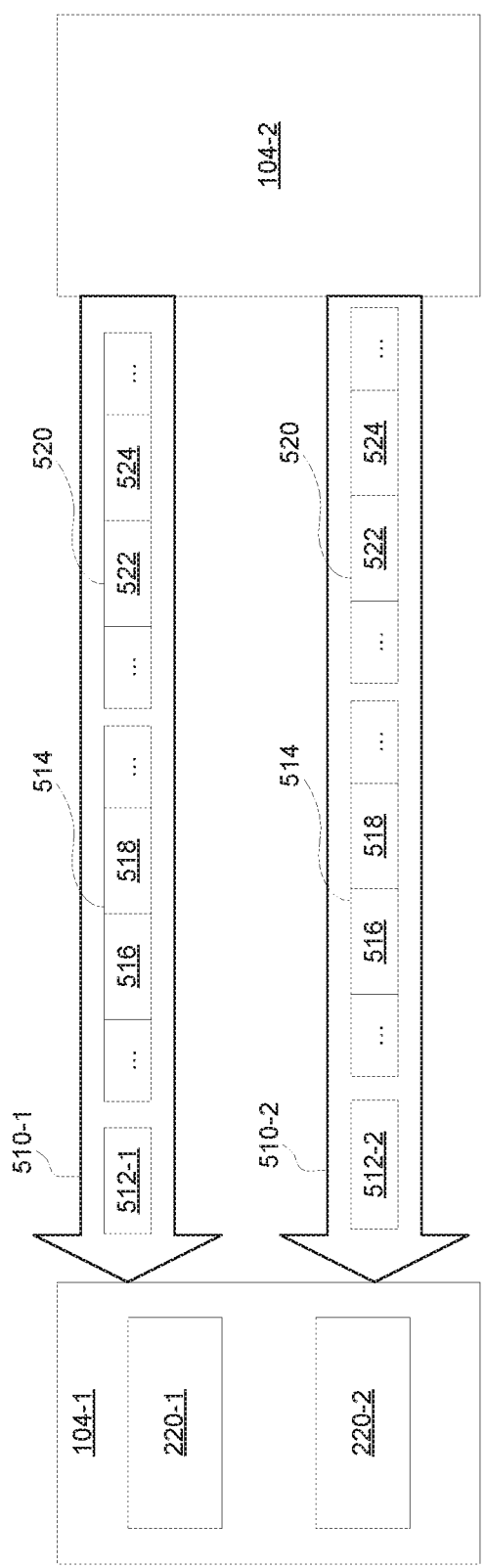
Figure 6:
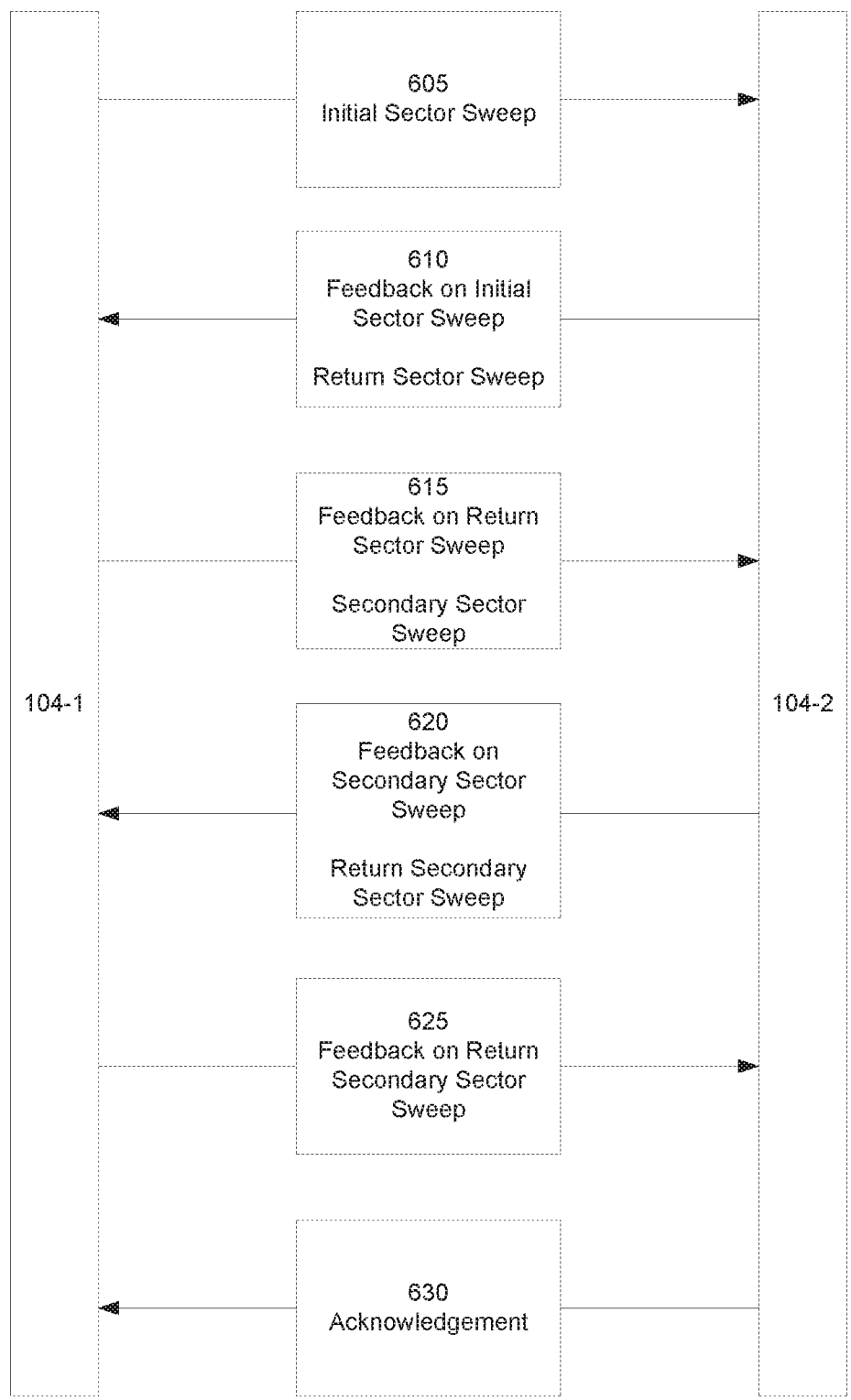

Embodiments are described with reference to the following figures, in which:

FIG. 1 depicts a wireless communications system;
FIG. 2 depicts certain internal components of a wireless device of the system of FIG. 1;
FIG. 3 depicts a method of establishing wireless connections in the system of FIG. 1
FIG. 4A depicts transmission of a first frame of a sector sweep in the system of FIG. 1;
FIG. 4B depicts transmission of a second frame of a sector sweep in the system of FIG. 1;
FIG. 5 depicts transmission of feedback data in the system of FIG. 1; and
FIG. 6 depicts a sequence of transmissions exchanged in the system of FIG. 1.

DETAILED DESCRIPTION

FIG. 1 depicts a wireless communications system 100, including a plurality of wireless devices 104 (also referred to as stations 104). In particular, FIG. 1 illustrates a first device 104-1 connected with a second device 104-2 via a wireless link 112. The first and second devices 104-1 and 104-2 may be access points such as a wireless router, a media server, a home computer, a client device configured as a soft access point and the like, or client devices, such as mobile devices such as smartphones, tablet computers and the like. More generally, the devices 104-1 and 104-2 can include any suitable combination of computing devices with wireless communication assemblies suitable for communicating with one another. Thus the wireless connection 112 may be established between the wireless devices 104 illustrated in FIG. 1, as well as any additional wireless devices (not shown) included in the system 100.

In the examples discussed below the devices 104 of the system 100 each include a wireless communications assembly configured to implement a shared wireless communication standard. In the present example, the devices 104 of the system 100 are each configured to communicate according to a wireless standard selected from the IEEE 802.11 family of standards. More specifically, the devices 104 are each configured to communicate according to the 802.11ay enhancement to the 802.11ad standard, both of which employ carrier frequencies of around 60 GHz (also referred to as mmWave). As will be apparent to those skilled in the art, the discussion below may also be applied to a wide variety of other communication standards.

Turning now to FIG. 2, before describing the operation of the devices 104 to implement the capability-signaling actions mentioned above, certain components of a generic device 104 will be described. As will be apparent, the description of the device 104 below also applies to each of the devices 104-1 and 104-2. That is, the devices 104-1 and 104-2 each include the components discussed below, though it will be understood that the particular implementation of each component may vary from device to device.

The device 104 includes a central processing unit (CPU), also referred to as a processor 200. The processor 200 is interconnected with a non-transitory computer readable storage medium, such as a memory 204, having stored thereon various computer readable instructions for performing various actions (e.g. streaming media to the device 108). The memory 204 includes a suitable combination of volatile (e.g. Random Access Memory or RAM) and non-volatile memory (e.g. read only memory or ROM, Electrically Erasable Programmable Read Only Memory or EEPROM, flash memory). The processor 200 and the memory 204 each comprise one or more integrated circuits.

The device 104 also includes one or more input devices, and one or more output devices, generally indicated as an input/output device 208. The input and output devices 208 serve to receive commands for controlling the operation of the device 104 and for presenting information, e.g. to a user of the device 104. The input and output devices 208 therefore include any suitable combination of devices, including a keyboard, a mouse, a display, a touchscreen, a speaker, a microphone, cameras, sensors, and the like). In other embodiments, the input and output devices may be connected to the processor 200 via a network, or may simply be omitted.

The device 104 further includes a wireless communications assembly 212 interconnected with the processor 200. The assembly 212 enables the device 104 to communicate with other computing devices. In the present example, as noted earlier, the assembly 212 enables such communication according to the IEEE 802.11ay standard, and thus transmits and receives data at frequencies of around 60 GHz.

The communications assembly 212 includes a controller 216 in the form of one or more integrated circuits, configured to establish and maintain communications links with other devices (e.g., links 112). The controller 216 is also configured to process outgoing data for transmission via one or more antennas or antenna arrays, of which two example antenna arrays 220-1 and 220-2 are illustrated (e.g. a phased array of antenna elements). The controller 216 is also configured to receive incoming transmissions from the arrays 220-1 and 220-2 and process the transmissions for communication to the processor 200. The controller 216, in the present example, therefore includes a baseband processor and a transceiver (also referred to as a radio processor), which may be implemented as distinct hardware elements or integrated on a single circuit. In other embodiments, the device 104 may include a plurality of controllers 216 and corresponding antenna arrays 220 within the communications interface 212.

Further, the controller 216 is configured to execute various computer-readable instructions (e.g. stored in a memory element integrated with the controller 216 or implemented as a discrete hardware component of the assembly 212 and connected with the controller 216) in the form of a control application 224 for performing the above functions. The control application 224 may be implemented as a software driver deployed to the assembly 212, for example via the processor 200. Via the execution of the application 224, the controller 216 is configured to operate the wireless communications assembly 212 to establish connections with the wireless communications assemblies of other devices 104. In particular, the controller 216 is configured to determine a direction for transmission to such other devices.

Turning now to FIG. 3, a method 300 of establishing wireless connections, and particularly of performing a beamforming procedure to determine a direction for transmission to enable such establishment is depicted. The method 300 will be described in connection with its performance on a device 104 as illustrated in FIG. 2. The blocks of the method 300 are performed by the controller 216 of the communications interface 212, via the execution of the application 224.

Generally, the method 300 includes performing, by the first device 104-1, a sector sweep. The sector sweep is composed of a plurality frames defined by frame data, as described further herein. The frames are transmitted by the first device 104-1 via beams transmitted using sectors of the antennas 220. Each antenna uses a sector to transmit a beam. Collectively, the antennas each use a sector to transmit a beam set.

At block 305, the controller 216 controls the antennas 220-1 and 220-2 to transmit a first frame of an initial sector sweep. Specifically, the antennas 220-1 and 220-2 simultaneously transmit respective first beams using a respective first sector of each of the antennas 220-1 and 220-2. The first sectors of each of the antennas 220 may be selected to be directed in approximately the same direction, or to be directed substantially omnidirectionally, or may be randomly selected. Alternately, the first sectors of each of each of the antennas 200 may be selected based on prior wireless connection data. Note that sectors selected to be used during a simultaneous transmission of one frame need not be selected to be selected in the same combination for use during a simultaneous transmission of another frame.

FIG. 4a depicts the antennas 220-1 and 220-2 transmitting the first frame of the initial sector sweep. The controller 216 may select first sectors 226-1 and 226-2 of antennas 220-1 and 220-2 respectively. The controller 216 controls the antenna 220-1 to use the first sector 226-1 to transmit a first beam 410-1. The first beam 410-1 includes first frame data 414. Similarly, the controller 216 controls the antenna 220-2 to use the first sector 226-2 to transmit a first beam 410-2. The first beam 410-2 also includes the first frame data 414.

In some implementations, the first beam 410-1 may include a first time delay 412-1 to offset the first frame data 414 and the first beam 410-2 may include a respective first time delay 412-2 to offset the first frame data 414. The first time delay 412-1 may be different from the first time delay 412-2 such that while the first beams 410-1 and 410-2 are transmitted simultaneously, the first frame data 414 contained within the beams 410-1 and 410-2 are transmitted with a time shift to avoid interference, and particularly interference resulting in null spaces. Further, the first time delays 412 may be selected such that the time shift provides sufficient diversity that the receiver in device 104-2 may accurately differentiate the frame data and corresponding signal strength received from each of the antennas 220-1 and 220-2.

The first frame data 414 contains a first beam set identifier element 416 identifying each of the antennas 220 and each of the first sectors 226. Hence the first beam set identifier element 416 identifies the antenna 220-1 and its first sector 226-1, and the antenna 220-2 and its first sector 226-2. The first frame data 414 may further include a countdown value 418 identifying the first frame of the initial sector sweep. The first frame data 414 may further include other elements such as a direction field, a final sweep identifier and the like.

Returning to FIG. 3, at block 310, the controller 216 controls the antennas 220-1 and 220-2 to transmit a second frame of the initial sector sweep. Specifically, the antennas 220-1 and 220-2 simultaneously transmit respective second beams using respective second sectors of each of the antennas 220-1 and 220-2.

FIG. 4b depicts the antennas 220-1 and 220-2 transmitting the second frame of the initial sector sweep. The controller 216 may select second sectors 228-1 and 228-2 of the antennas 220-1 and 220-2 respectively. The controller 216 controls the antenna 220-1 to use the second sector 228-1 to transmit a second beam 420-1. The second beam 420-1 includes second frame data 424. Similarly, the controller 216 controls the antenna 220-2 to use the second sector 228-2 to transmit a second beam 420-2. The second beam 420-2 also includes the second frame data 424.

As with the first beams 410-1 and 410-2, the second beam 420-1 may include a second time delay 422-1 and the second beam 420-2 may include a respective second time delay 422-2.

The second frame data 424 contains a second beam set identifier element 426 identifying each of the antennas 220 and each of the second sectors 228. Hence the second beam set identifier element 426 identifies the antenna 220-1 and its second sector 228-1, and the antenna 220-2 and its second sector 228-2. The second frame data 424 may further include a countdown value 428 identifying the second frame of the initial sector sweep. The second frame data 424 may further include other elements such as a direction field, a final sweep identifier and the like.

The controller 216 may subsequently control the antennas 220 to transmit further frames of the initial sector sweep. Specifically, the antennas 220 may simultaneously transmit respective further beams using respective further sectors of each of the antennas 220. The further beams include further frame data containing further beam set identifier elements identifying each of the antennas 220 and each further sector of the frame.

Each frame of the initial sector sweep is thus defined by respective frame data. The frame data may identify the frame, for example by the beam set identifier elements identifying the set of antennas and sectors used to transmit the frame, or by the countdown value identifying the frame within the initial sector sweep.

In some implementations, the beam set identifier elements 416 and 426 are obtained from a look-up table stored in a memory of the controller 216. For example, the look-up table may store combinations of antenna identifiers of each of the antennas 220 and sector identifiers of each of the sectors of the antennas as well as a corresponding beam set identifier element. In other implementations, the beam set identifier elements 416 and 426 are hash values generated by the controller 216. For example, the controller 216 may apply a hash function such as a cyclic redundancy check (CRC) function, SHA-1, and the like, to generate the hash values from antenna identifiers of each of the plurality of antennas 220 and sector identifiers of each of the sectors 226 and 228. In such implementations, the device 104-1 may store a hash table of hash values and corresponding antenna and sector combinations. Upon receiving a selection of a beam set identifier element, therefore, the controller 216 retrieves the corresponding antenna and sector combination via a table lookup.

More generally, the beam set identifier elements identify each of the antennas and each of the sectors used to transmit beams in the beam set for the first device 104-1. In particular, a receiver, such as the second device 104-2, need not be able to identify the set of antennas and sectors of a frame. Rather, the receiver may simply identify the signal strength of a particular frame based on the beam set identifier element, and transmit the beam set identifier element as feedback data to the first device 104-1. The first device 104-1 may use the beam set identifier element to identify the antennas and sectors used to transmit the beams in the beam set, and may process the information accordingly.

In the present example, the frame data is consistent between beams sent within the same frame, that is, between beams which are transmitted simultaneously. However, it is also contemplated that the frame data may vary between beams sent within the same frame. For example, the frame data may contain a beam identifier element which identifies the particular antenna and sector used to transmit the beam. The beam identifier element, and hence the frame data, may therefore vary between antenna-sector combinations and between beams.

In some implementations, the first frame data may be transmitted in a first packet, the second frame data may be transmitted in a second packet, and each further frame data transmitted in a respective further packet. In other implementations, the first frame data, the second frame data, and the further frame data may be transmitted in a single packet. In such an implementation, the frame data may include further fields such as training field to identify frames within the packet.

Returning to FIG. 3, at block 315, upon completion of the initial sector sweep, the first station 104-1 receives first feedback data from the second station 104-2.

Referring now to FIG. 5, the first station 104-1 may receive a first beam 510-1 including first feedback data 520. The first feedback data 520 contains a best beam set identifier element 522 selected from the first beam set identifier element 416, the second beam set identifier element 426 and any further beam set identifier elements.

The best beam set identifier element 522 may be selected by the second station 104-2 based on the highest overall received signal strength, the highest received signal strength from a single antenna, or other suitable ranking criteria.

For example, the second station 104-2 may receive the first beam 410-1 and the first beam 410-2. Since the first beams 410-1 and 410-2 include first time delays 412-1 and 412-2 respectively, the frame data 414 received by the second station 104-2 is received with a time shift. Specifically, the frame data 414 received from the first beam 410-1 and 410-2 may result in two distinguishable signal peaks, corresponding to signal strengths of the respective first beams. Hence, the second station 104-2 may differentiate the frame data 414 received from the antenna 220-1 and the antenna 220-2.

In some implementations, the signal strengths of the frame data 414 from each frame may be summed to obtain an overall received signal strength. Once the overall received signal strength has been calculated for each frame, the second station 104-2 may select the beam set identifier element corresponding to the highest overall received signal strength as the best beam set identifier element 522. In other implementations, the best beam set identifier element 522 may be selected based on the frame having the highest received signal strength for a single beam and corresponding antenna. Other suitable ranking criteria for selecting a best beam set identifier element 522 are also contemplated. The feedback data 520 may further include a signal-to-noise ratio (SNR) field representing the received signal strength of the selected best beam set identifier element 522.

In the present example, the received signal strengths are processed by the second station 104-2 and the best beam set identifier element 522 is selected based on the resulting information. However, no further feedback on individual received signal strengths is provided to the first station 104-1. In other examples, the feedback data 520 may further include individual antenna fields to transmit individual antenna received signal strength data to the first station 104-1. In further examples, individual antenna received signal strength data may be transmitted in further wireless connection procedures, subsequent to establishing an initial wireless connection.

The first feedback data 520 may also contain a countdown map 524 identifying a received indicator for each countdown value sent in the initial sector sweep. Each countdown value 418 and 428 corresponds to a frame of the initial sector sweep, hence the countdown map 524 may provide additional information per frame regarding the signal received by the second device 104-2.

In some implementations, the received indicators of the countdown map 524 may represent corresponding frames which were received by the second device 104-2. In other implementations, the received indicators may represent corresponding frames which had a received signal strength above a threshold value. In further implementations, the received indicators may represent the received signal strength of each corresponding frame. Other representations of the received indicators which provide additional information per frame regarding the signal received by the second device 104-2 are also contemplated.

In some implementations, the second station 104-2 may perform a return sector sweep. Hence the first beam 510-1 may be transmitted by a first antenna using a first sector, and may further include a time delay 512-1 and frame data 514. The frame data 514 contains a beam set identifier element 516 identifying each antenna and each sector of the second station 104-2 and a countdown value 518, as well as other elements such as a direction field, a final sweep identifier and the like. The second station 104-2 may also simultaneously transmit a second beam 510-2 by a second antenna using a second sector. The second beam 510-2 may include a time delay 512-2, the frame data 514, and the feedback data 520.

Returning to FIG. 3, at block 320, the controller 216 controls the antennas 220-1 and 220-2 to transmit a first frame of a secondary sector sweep based on the first feedback data 520. Specifically, the controller 216 may select third sectors of the antennas 220-1 and 220-2 based on the first feedback data. For example, the controller 216 may select the third sectors based on proximity to the sectors and antennas identified by the best beam identifier element 520. Alternately, the controller 216 may select the third sectors based on combinations of sectors identified by beam identifier elements corresponding to received indicators in the countdown map.

The controller 216 then controls the antennas 220-1 and 220-2 simultaneously to transmit respective third beams using the respective third sectors of each of the antennas 220-1 and 220-2. The third beams may each include third frame data and respective third time delays. The third frame data may contain a third beam set identifier identifying each of the antennas and each of the third sectors.

At block 325, the controller 216 controls the antennas 220-1 and 220-2 to transmit a second frame of the secondary sector sweep based on the first feedback data 520. Specifically, the controller may select fourth sectors of the antennas 220-1 and 220-2 based on the first feedback data. The controller 216 then controls the antennas 220-1 and 220-2 simultaneously to transmit respective fourth beams using the respective fourth sectors of each of the antennas 220-1 and 220-2. The fourth beams may each include fourth frame data and respective fourth time delays. The fourth frame data may contain a fourth beam set identifier identifying each of the antennas and each of the fourth sectors.

The controller 216 may subsequently control the antennas 220 to transmit further frames of the secondary sector sweep. Specifically, the antennas 220 may simultaneously transmit respective further beams using respective further sectors of each of the antennas 220. The further beams include further frame data containing further beam set identifier elements identifying each of the antennas 220 and each further sector of the frame.

At block 330, upon completion of the secondary sector sweep, the first station 104-1 receives second feedback data from the second station 104-2. Similar to the first feedback data 520, the second feedback data contains a best beam set identifier element selected from the third beam set identifier element, the fourth beam set identifier element, and any further beam set identifier elements.

FIG. 6 depicts a sequence 600 of transmissions exchanged between the first station 104-1 and the second station 104-2.

At block 605, the first device 104-1 performs an initial sector sweep as outlined above. The initial sector sweep is received by the second device 104-2.

At block 610, the second device 104-2 transmits feedback data relating to the initial sector sweep, as well as performing a return sector sweep. The feedback data and the return sector sweep are received by the first device 104-1.

At block 615, the first device 104-1 transmit feedback data relating to the return sector sweep, as well as performing a secondary sector sweep. The feedback data and the secondary sector sweep are received by the second device 104-2.

At block 620, the second device 104-2 transmits feedback data relating to the secondary sector sweep, as well as performing a return secondary sector sweep. The feedback data and return secondary sector sweep are received by the first device 104-1.

In some implementations, the first device 104-1 and the second device 104-2 may continue to exchange further sector sweeps and transmit further feedback data as necessary. In such implementations, the final sector sweep may be identified using the final sweep identifier field of the frame data.

The number further sector sweeps may be limited, for example, to a set number of iterations based on the number of antennas 220. Alternately, the sector sweeps iterations may be terminated when a threshold for the SNR field indicating the received signal strength of the best beam set has been reached, or other suitable criteria.

Where multiple iteration sector sweeps are employed, the controller 216 may select sectors based on various criteria. For example, the controller 216 may select the combinations of antennas and sectors to allow more combinations to be tested during multiple sweeps to receive broad feedback. Alternately, the controller 216 may select the combinations of antennas and sectors for the secondary sector sweeps based on feedback from previous sector sweeps, to allow for refinement of the results. Still further, where the antennas 220 have the capability to vary the sector size, the controller 216 may select with large sectors during the initial sector sweep, and select smaller sectors during the secondary and further sector sweeps to continue refining the results.

At block 625, upon completion of the further sector sweeps, the first device 104-1 transmits feedback data relating to the final sector sweep. The feedback is received by the second device 104-2.

At block 630, the second device 104-2 transmits an acknowledgement, received by the first device 104-1.

The scope of the claims should not be limited by the embodiments set forth in the above examples, but should be given the broadest interpretation consistent with the description as a whole.

The invention claimed is:

1. A method in a wireless communications assembly of a first station having a plurality of antennas and configured to perform a beamforming procedure with a second station, the method comprising:

controlling the plurality of antennas to simultaneously transmit, using a first sector of each of the plurality of antennas, a respective first beam including first frame data containing a first beam set identifier element identifying each of the plurality of antennas and each of the first sectors;

subsequently controlling the plurality of antennas to simultaneously transmit, using a second sector of each of the plurality of antennas, a respective second beam including second frame data containing a second beam set identifier element identifying each of the plurality of antennas and each of the second sectors;

receiving, from the second station, first feedback data including one of the first beam set identifier element and the second beam set identifier element;

based on the first feedback data, controlling the plurality of antennas to simultaneously transmit, using a third sector of each of the plurality of antennas, a respective third beam including third frame data containing a third beam set identifier element identifying each of the plurality of antennas and each of the third sectors;

based on the first feedback data, subsequently controlling the plurality of antennas to simultaneously transmit, using a fourth sector of each of the plurality of antennas, a respective fourth beam including fourth frame data containing a fourth beam set identifier element identifying each of the plurality of antennas and each of the fourth sectors; and receiving, from the second station, second feedback data including one of the third beam set identifier element and the fourth beam set identifier element.

2. The method of claim 1 wherein the first beam set identifier element and the second beam set identifier element are obtained from a look-up table stored in a memory of the first station.

3. The method of claim 1 wherein the first beam set identifier element and the second beam set identifier element are a hash value generated from antenna identifiers of each of the plurality of antennas and sector identifiers of each of the sectors.

4. The method of claim 1 wherein each of the first beams further include respective first time delays to offset the first frame data, and wherein each of the second beams further include respective second time delays to offset the second frame data.

5. The method of claim 1 wherein the first frame data includes a first countdown value and the second frame data includes a second countdown value.

6. The method of claim 5 wherein the first feedback data includes a countdown map identifying a received indicator for each of the first countdown value and the second countdown value.

7. The method of claim 1 wherein the first frame data is sent in a first packet, and the second frame data is sent in a second packet.

8. The method of claim 1 wherein the first frame data and the second frame data are sent in a single packet.

9. A wireless communications assembly comprising:
a plurality of antenna arrays; and
a controller interconnected with the plurality of antenna arrays, the controller configured to:
control the plurality of antennas to simultaneously transmit, using a first sector of each of the plurality of antennas, a respective first beam including first frame data containing a first beam set identifier element identifying each of the plurality of antennas and each of the first sectors;

subsequently control the plurality of antennas to simultaneously transmit, using a second sector of each of the plurality of antennas, a respective second beam including second frame data containing a second beam set identifier element identifying each of the plurality of antennas and each of the second sectors;

receive, from the second station, first feedback data including one of the first beam set identifier element and the second beam set identifier element;

based on the first feedback data, control the plurality of antennas to simultaneously transmit, using a third sector of each of the plurality of antennas, a respective third beam including third frame data containing a third beam set identifier element identifying each of the plurality of antennas and each of the third sectors;

based on the first feedback data, subsequently control the plurality of antennas to simultaneously transmit, using a fourth sector of each of the plurality of antennas, a respective fourth beam including fourth frame data containing a fourth beam set identifier element identifying each of the plurality of antennas and each of the fourth sectors; and receive, from the second station, second feedback data including one of the third beam set identifier element and the fourth beam set identifier element.

10. The wireless communications assembly of claim 9 wherein the first beam set identifier element and the second beam set identifier element are obtained from a look-up table stored in a memory of the controller.

11. The wireless communications assembly of claim 9 wherein the first beam set identifier element and the second beam set identifier element are a hash value generated from antenna identifiers of each of the plurality of antennas and sector identifiers of each of the sectors.

12. The wireless communications assembly of claim 9 wherein each of the first beams further include respective first time delays to offset the first frame data, and wherein each of the second beams further include respective second time delays to offset the second frame data.

13. The wireless communications assembly of claim 9 wherein the first frame data includes a first countdown value and the second frame data includes a second countdown value.

14. The wireless communications assembly of claim 13 wherein the first feedback data includes a countdown map identifying a received indicator for each of the first countdown value and the second countdown value.

15. The wireless communications assembly of claim 9 wherein the first frame data is sent in a first packet, and the second frame data is sent in a second packet.

16. The wireless communications assembly of claim 9 wherein the first frame data and the second frame data are sent in a single packet.

* * * * *